(12) United States Patent
Sand

(10) Patent No.: US 9,292,020 B2
(45) Date of Patent: Mar. 22, 2016

(54) FAIL SAFE ENGINE COOLANT THERMOSTAT

(71) Applicant: Darrel R. Sand, Okemos, MI (US)

(72) Inventor: Darrel R. Sand, Okemos, MI (US)

( * ) Notice: Subject to any disclaimer, the term of this patent is extended or adjusted under 35 U.S.C. 154(b) by 0 days.

(21) Appl. No.: 14/053,169

(22) Filed: Oct. 14, 2013

(65) Prior Publication Data

US 2014/0034740 A1 Feb. 6, 2014

Related U.S. Application Data

(63) Continuation-in-part of application No. 12/777,641, filed on May 11, 2010, now Pat. No. 8,556,186.

(60) Provisional application No. 61/177,050, filed on May 11, 2009.

(51) Int. Cl.
*F01P 7/16* (2006.01)
*G05D 23/185* (2006.01)

(52) U.S. Cl.
CPC .............. *G05D 23/1854* (2013.01); *F01P 7/16* (2013.01)

(58) Field of Classification Search
CPC .......... F01P 7/14; F01P 7/16; F01P 2007/146; G05D 23/024; G05D 23/025; G05D 23/08; G05D 23/10; G05D 23/1852; G05D 23/1854; G05D 23/2754

USPC .......... 236/34, 34.5, 101 E, 101 R; 123/41.09; 137/15.25

See application file for complete search history.

(56) References Cited

U.S. PATENT DOCUMENTS

| | | | |
|---|---|---|---|
| 2,255,543 A * | 9/1941 | Fisher | 236/34 |
| 5,050,547 A | 9/1991 | Takahashi | |
| 5,806,481 A | 9/1998 | Ikegaya | |
| 6,488,000 B2 | 12/2002 | Metz et al. | |
| 2005/0279296 A1 | 12/2005 | Coney et al. | |
| 2008/0196686 A1 | 8/2008 | Plohberger | |

* cited by examiner

*Primary Examiner* — Marc Norman
(74) *Attorney, Agent, or Firm* — Young Basile Hanlon & MacFarlane, P.C.

(57) ABSTRACT

A fail-safe engine coolant thermostat includes a body having a bore with an inlet and an outlet. A thermal actuator capable of extended and retracted positions due to coolant temperature is disposed in the body. A valve plate is pivotally mounted in the body to open and close fluid flow through the body. A connecting member is coupled between the thermal actuator and the valve plate to pivot the valve plate to the closed flow position. A pivot connection of the valve plate to the body is diametrically off center to the valve plate to pivot to the fluid flow open position under coolant fluid flow pressure unless the thermal actuator, at cold fluid temperatures, pivots the value plate to the closed position through the connecting member. An adjustment is provided for the connecting member to enable adjustment of the valve plate to the full closed position.

3 Claims, 5 Drawing Sheets

FAIL SAFE ENGINE COOLANT THERMOSTAT

CROSS REFERENCE TO CO-PENDING APPLICATION

This application is a continuation-in-part of co-pending U.S. patent application Ser. No. 12/777,641 filed on May 11, 2010, in the name of Darrell R. Sand, which claims priority from U.S. Provisional Patent Application Ser. No. 61/177,050 filed May 11, 2009, the entire contents of both of which are incorporated herein by reference.

BACKGROUND

The present disclosure relates, in general, to vehicle cooling system thermostats.

A thermostat is employed in vehicle cooling systems to control the flow of engine coolant to a heat exchanger or radiator. The thermostat is normally closed blocking flow to the radiator immediately after an engine is started when the engine coolant is at a relatively low or cold temperature. When a predetermined higher or hot temperature is reached, the thermostat opens allowing coolant to flow to the radiator to take advantage of the heat exchange properties of the radiator so as to maintain the engine coolant at a substantially constant temperature during continuous engine operation.

While thermostats are usually reliable in operation, they can still fail. A typical thermostat failure results in the thermostat being disposed in a flow blocking position preventing coolant flow to the radiator. This can lead to catastrophic engine failure due to extreme engine overheating.

SUMMARY

A fail-safe thermostat for controlling coolant flow between an engine and a radiator that has a body with a bore extending between an inlet and an outlet. The body is adapted to be coupled between the engine and the radiator flow path. A thermally responsive actuator is disposed in the body and exposed to coolant fluid flow. The thermal actuator is capable of assuming extended and retracted positions depending on coolant temperature. A valve plate is pivotally mounted in the body in a location to open and close fluid flow from the inlet to the outlet.

In one aspect, a connecting member is coupled between the thermal actuator and the valve plate to pivot the valve plate between a fluid flow, open position and a fluid flow closed position relative to the outlet in the body in the response to the extended and retracted positions of the thermoactuator.

The pivotal connection to the valve plate to the body is connected off center from a diametrical center line through the valve plate to define a larger surface area on the valve plate to one side of the pivot connection and a smaller surface area of the valve plate to the opposed side of the pivot connection whereby, in absence of a continuous workable connection between thermoactuator, the connecting member and the valve plate, the valve plate can freely pivot to the open position allowing coolant flow to the engine under the influence of the force of the coolant flow differential on the larger and smaller surface area portions of the valve plate. The connecting member maybe pivotally connected to the valve plate and the thermal actuator. The thermal actuator can be a stack of bimetal material leaves.

A valve seat is defined in the body for the closed position of the valve plate. A flange is part of the body and includes a channel defining the outlet of the body. The seat is defined by edges of the channel and the flange.

In another aspect of the fail-safe thermostat, the valve plate is coupled to the body in a position tending to allow the valve plate to normally pivot to the fluid flowing allowing position. A thermal responsive actuator is mounted in the body and has a first end fixed in the housing and an opposed freely movable second end. A connector is coupled between the second end of the thermal responsive actuator and the valve plate to move the valve plate to the flow blocking position at a low coolant temperature. An enlarged aperture is formed in the second end of the thermal responsive actuator. One end of the connector non-contactingly extends through the aperture in the thermal actuator. A threaded connection between the one end of the connector and a nut on an exterior side of the thermal actuator allows adjustment of the valve plate to the full closed position of the valve plate. An opposite end of the connector is coupled to a mounting plate carried on the valve plate. A pivot connection of the valve plate to the body is connected diametrically off center to define a larger surface area on the valve plate to one side of the pivot connection and a smaller surface area on the valve plate to the opposed side of the pivot connection. Regardless of the presence or absence of a workable connection between thermal actuator, the connecting member and the valve plate, the valve plate can freely pivot to the coolant flow allowing position under the influence of the fluid pressure flow force of the coolant flow differential on the larger and smaller surface area portions of the valve plate. The second end of the thermal actuator, when contracting to a first position under declining coolant temperatures, engages the nut causing movement of the connector and pivoting of the valve plate to the fluid blocking position.

The fail-safe engine coolant thermostat includes an aperture formed in a wall of the body allowing access to the nut to adjust a position or length of the connector relative to the thermal actuator in the valve plate to dispose the valve plate in the fluid blocking position.

BRIEF DESCRIPTION OF THE DRAWING

The various features, advantages and other uses of the present fail-safe engine coolant thermostat will become more apparent by referring to the following detailed description and drawing in which.

DETAILED DESCRIPTION

Figure 1:
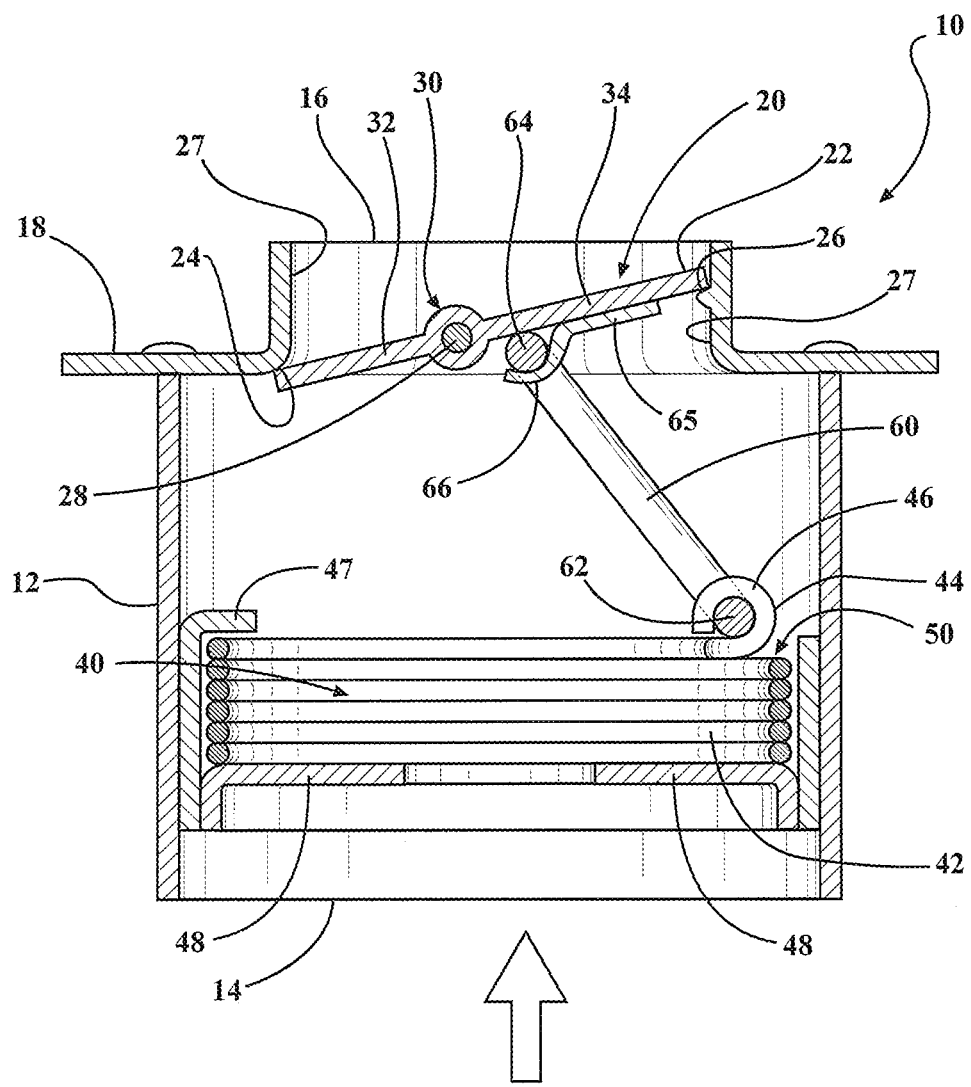
FIG. 1 is a cross sectional view of a fail-safe thermostat shown in the flow blocking, closed position.
Figure 2:
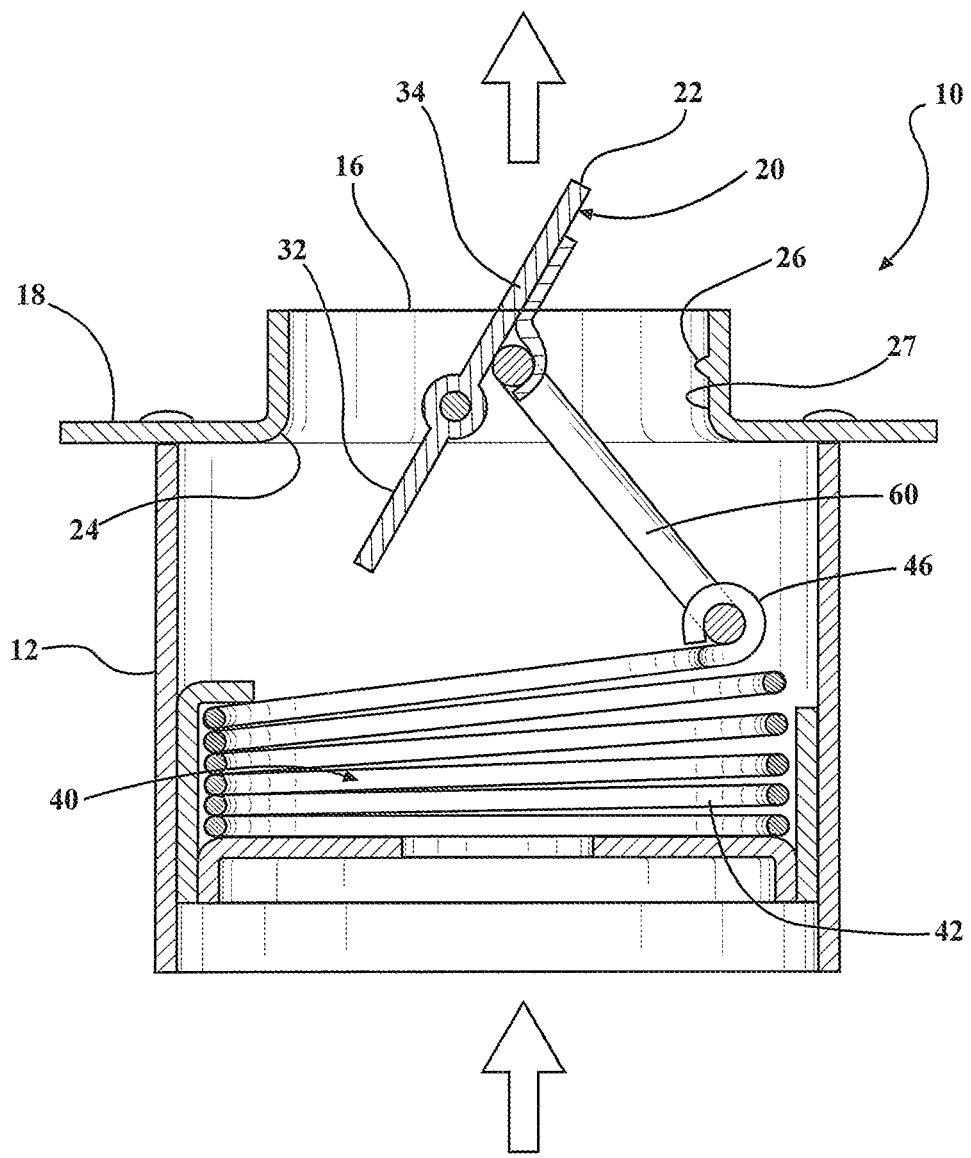
FIG. 2 is a cross sectional view of the fail-safe thermostat shown in FIG. 1; but with the thermostat valve depicted in the flow allowing, open position.

Referring now to FIGS. 1 and 2, there is depicted a fail-safe engine coolant thermostat 10 which is configured for fail-safe operation so as to be disposed in a normally opened, coolant flow allowing position in the event of a mechanical failure of a component of the thermostat 10.

The thermostat 10 includes an body 12 having an inlet 14 and an outlet 16. The body 12 is mounted or fluidically coupled to an engine coolant flow passageway to be in the coolant flow path from the engine to the radiator or engine heat exchanger. A mounting flange 18 may be coupled to one end or integrally formed as a unitary part of the body 12 to facilitate mounting of the thermostat 10 in a vehicle engine.

The thermostat 10 includes a valve 20 which is in a form of a butterfly valve having a substantially circular valve plate 22. The plate 22 has a generally planar configuration with an outer diameter sized to sealingly engage valve seat surfaces 24 and 26 formed about a channel 27 in the mounting flange 18. The outer diameter of the valve plate 22 is sized to sealingly close off and block fluid flow through the channel 27 in the mounting flange 18 within the thermostat outlet 16.

The plate 22 is pivotally mounted within the body 12 or mounting flange 18 by means of a pivot pin 28 extending through an enlarged intermediate of a pivot connection 30 integrally formed with or attached to the plate 22.

In the present aspect of the fail-safe thermostat 10, the plate 22 is pivotally coupled to the mounting flange 18 in a lateral off center position. Due to this off center pivot connection, as shown in FIG. 1, one side portion 32 of the plate 22 to one side of the pivot pin 28 is smaller than the opposite side portion 34 extending from an opposite direction from the pivot pin 28.

A thermally responsive actuator 40 is mounted within the thermostat body 12. The thermally responsive actuator 40 can be any thermally responsive component which is capable of exhibiting movement, either expansion or contraction or in axial or linear directions, in response to temperature changes, such as the temperature of an engine coolant flowing through and around the thermal actuator 40.

Figure 3:
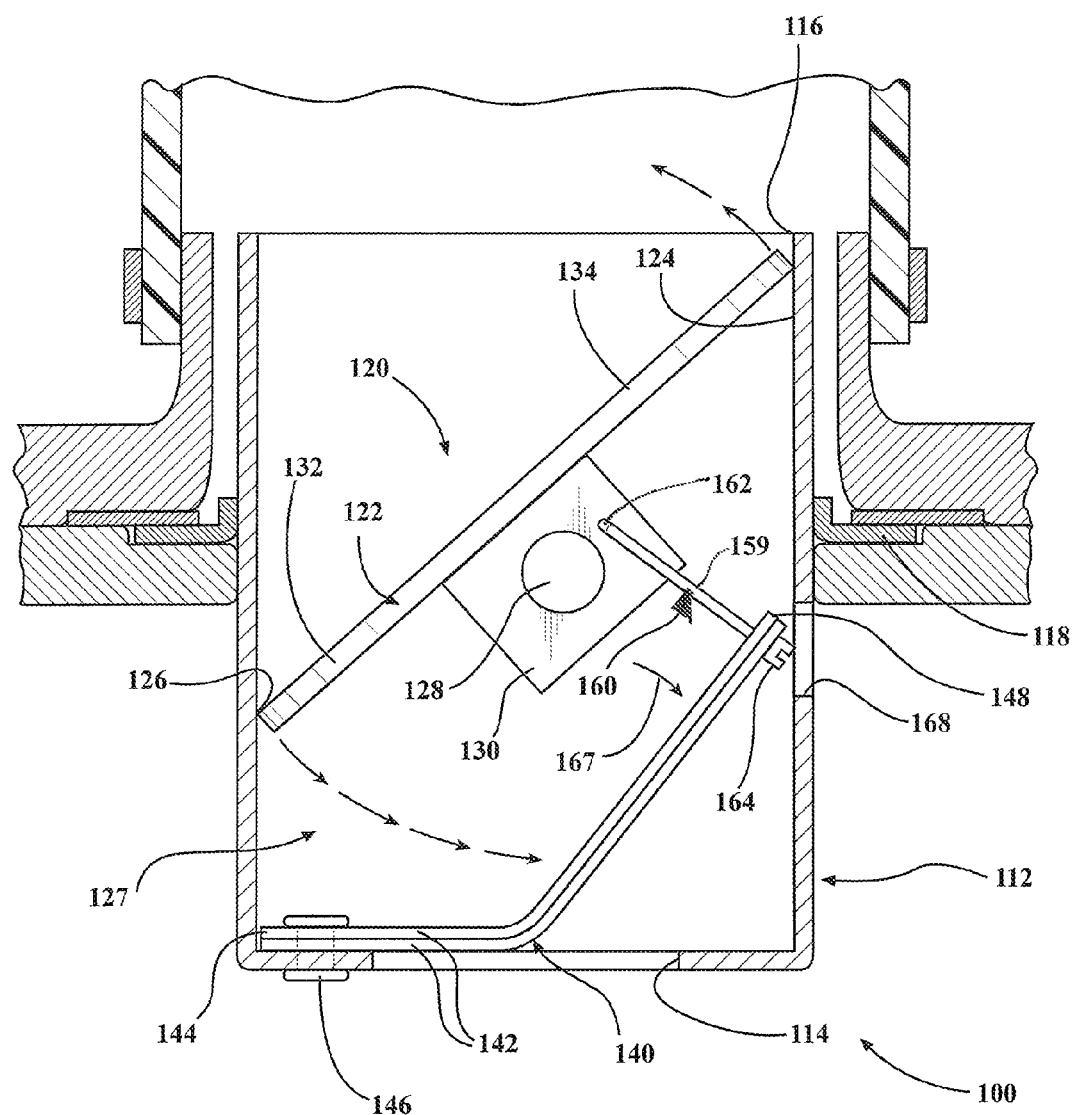
FIG. 3 is a cross sectional view of another aspect of a fail-safe thermostat shown in valve closed position and having an adjustable full closed feature.

By way of example only, the thermally responsive actuator 40 is depicted as being formed of a plurality of bimetal material leaves 42. The bimetal material leaves 42 may be individual leaves arranged in a stack or a spiral, coil arrangement of a continuous strip of bimetal material or an angled strip or strips of bimetal material as shown in FIG. 3. The bimetal material leaves 42, as explained above, have a hollow bore providing a coolant flow bore between the inlet 14 and outlet 16 of the thermostat body 12. One of the bimetal leaves 42 has an end portion 44 formed in a turned over loop 46.

The bimetal leaves 42 are fixedly and non-movably constrained along one side edge or end by a pair of flanges 47 and 48 joined together and/or otherwise fixed with respect to the thermostat body 12. The diametrically opposite side edges of the bimetal material leaves 42 seat on one mounting flange 48 which itself is fixed to the thermostat body 12. This arrangement allows the side edges 50 of the bimetal leaves 42 to exhibit expansion and contraction movement as shown in the difference between the position of the bimetal material leaves 42 in FIGS. 1 and 2.

At a low engine coolant temperature, which is typical of the temperature of the engine coolant immediately after the engine is started, the bimetal material leaves 42 are in a completely retracted position forming a substantially contiguous stack shown in FIG. 1 However, when the engine coolant temperature reaches a predetermined higher or hot temperature, the bimetal material leaves 42 expand. Since one side edge of the bimetal leaves 42 is restrained between the mounting flanges 47 and 48, only the opposed end portions 50 will exhibit movement between the first and second positions shown in FIGS. 1 and 2, respectively.

A connecting member or link 60 is coupled between the valve plate 22 and the bimetal stack 40. By way of example only, the connecting member 60 is in the form of a rod having a first outwardly bent end 62 coupled to the loop 46 in one end of the bimetal material leaves 42 and an opposite bent end 64 which is coupled to a loop 66 formed in a flange 65 fixedly coupled to the valve plate 22.

The engagement of the ends 62 and 64 of the connecting member or rod 60 and the valve plate 22 couples expansion and contraction of the bimetal material leaves 42 in response to changes in engine coolant temperature to pivotal movement of the valve plate 22 between the first coolant flow blocking or closed position shown in FIG. 1 and the second coolant flow allowing, open position shown in FIG. 2.

In operation, when the engine is off or has just been started, the temperature of the engine coolant is normally at a low or "cold" temperature. This temperature causes the bimetal material leaves 42 to contract into the closely arranged stack shown in FIG. 1. This contraction results in movement of the loop 46 on the edge of one of the bimetal material leaves 42 in a downward direction in the orientation of the thermostat 10 shown by way of example in FIG. 1. This downward movement enables the rod 60 to pull the valve plate 22 to the closed, coolant flow blocking position depicted in FIG. 1. In this closed position, the outer periphery or edges of the valve plate 22 sealingly engage the seat surfaces 24 and 26 on the mounting flange 18 of the thermostat body 12 to prevent fluid flow from the inlet 14 through the outlet 16 of the thermostat 12 to the engine radiator.

When the engine coolant temperature rises to a predetermined or so call "hot" temperature, the bimetal material leaves 42 expand. Since one side edge of the bimetal material leaves 42 is restrained from movement by the mounting flanges 46 and 48, the opposite end of the bimetal material leaves 42 carrying the loop 46 is allowed to expand in the direction shown by the difference between the position of the loop 46 in FIGS. 1 and 2. This movement, through the rod 60 pushes the off center mounted valve plate 22 to the fluid flow allowing, open position depicted in FIG. 2 which coolant flow is allowed to exit the outlet 16 of the thermostat 10 and flow to the engine heat exchanger or radiator.

When the engine is turned off, and the temperature of the engine coolant decreases back toward the "cold" temperature, the moveable ends of the bimetal material leaves 42 will contract moving loop 46 in a downward direction back to the position shown in FIG. 1. This downward movement causes the rod 60 to exert a pulling force on the valve plate 22 causing the valve plate 22 to pivot from the open position shown in FIG. 2 back to the closed position shown in FIG. 1.

A typical failure mode for the thermostat 10 will be a mechanical failure or breakage of any one or more of the mechanical connections of the rod ends 62 and 64 to the loop 46 or to the valve plate 22 thereby disconnecting contraction and expansion of the bimetal material leaves 42 from the valve plate 22.

However, the unique off center pivot mounting of the valve plate 22 relative to the pivot pin 28 enables pressurized fluid flow through the thermostat body 12 to act on the side portions 32 and 34 of the valve plate 22 in an unequal manner such that the coolant flow impinging on the larger surface area of the side portion 34 will create a greater pivotal force on the valve plate 22 than the force exerted by the fluid flow on the smaller portion 32 of the valve plate 22. This unequal force distribution enables the valve plate 22 to freely pivot about the pivot pin 28 toward the open position shown in FIG. 2 allowing coolant to continue to flow to the radiator and preventing a catastrophic engine overheating condition.

Figure 4:
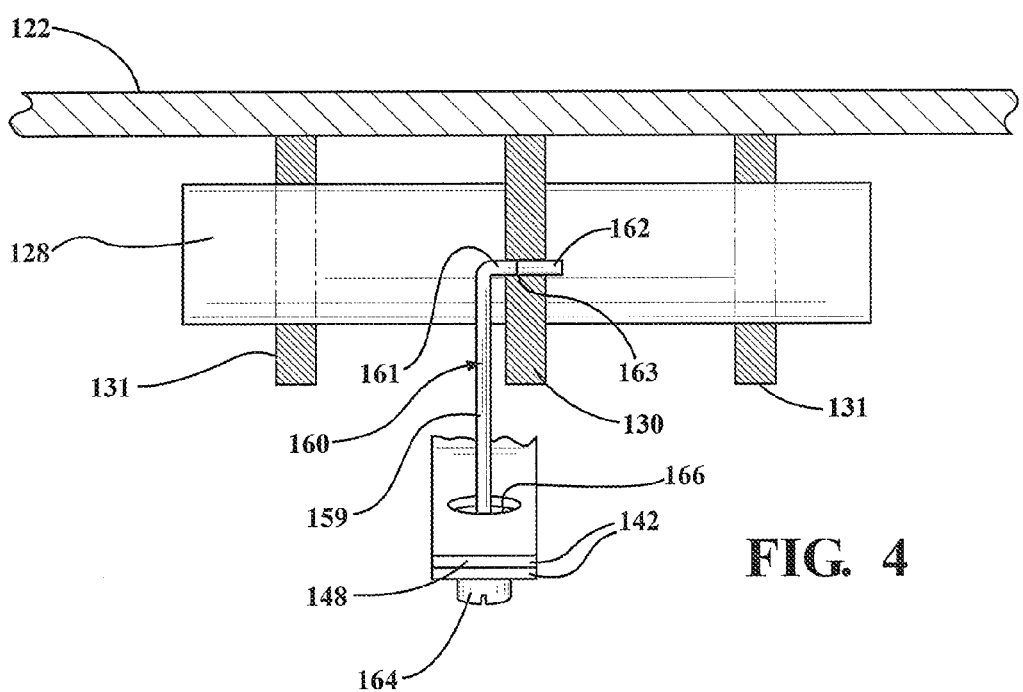
FIG. 4 is a side elevational view of the adjustment means to valve plate connection shown in FIG. 3.
Figure 5:
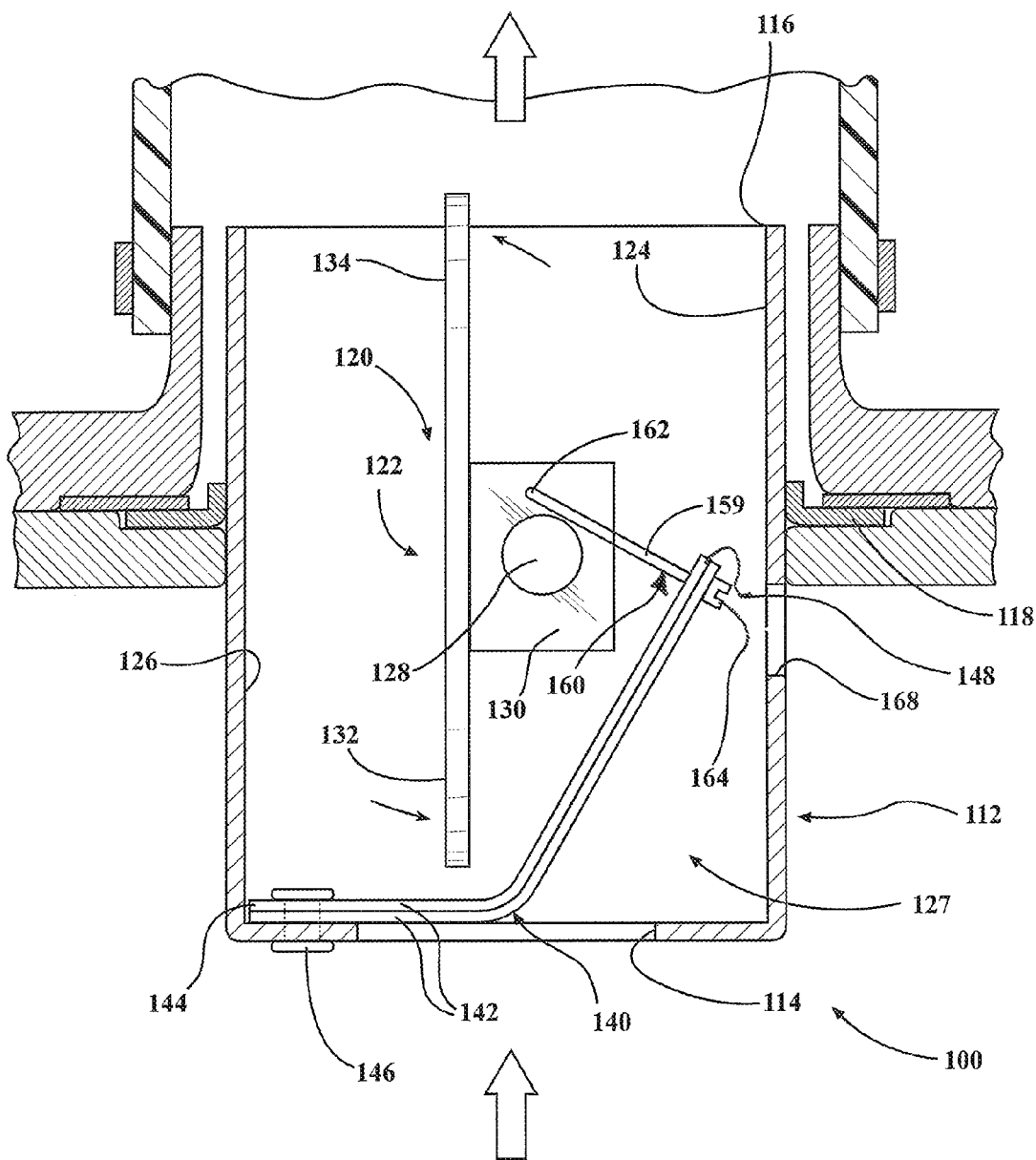
FIG. 5 is a side elevational view of the valve shown in FIGS. 3 and 4 in an open fluid flow state.

Another aspect of a fail-safe thermostat 100 is shown in FIGS. 3, 4 and 5. The thermostat 100 includes a body 112 having an inlet 114 and an outlet 116. The body 112 is mounted or fluidically coupled to an engine coolant flow passageway so as to be interposed in the coolant flow path from the engine to radiator or engine heat exchanger. An L shaped flange or ring 118 is fixed, such as by welding, soldering or by separate fasteners, to the outer periphery of the body 112. As shown in FIG. 3, the L-ring 118 is adapted to be interposed between the head casting of an engine, a gasket, and a cylindrical neck member which allows clamped attachment of a radiator hose about the outlet end 116 of the body 112.

The thermostat 100 includes a valve 120 which is in the form of a butterfly valve having a substantially circular valve plate 122. The valve plate 122 has a generally planar configuration with an outer diameter size to sealingly engage circumferential valve seat surfaces 124 disposed on the interior wall of the body 112. The outer diameter of the valve plate 122 is sized to sealingly close off and block fluid flow through a channel 127 formed in the body 112 between the inlet 114 and the outlet 116 when the valve plate 122 is in the closed position shown in FIG. 4.

The valve plate 122 is pivotally mounted within the body 112 by a pivot pin 128 extending between opposed walls of the body 112 and a mounting plate 130. The mounting plate 130 includes a central aperture sized to enable the mounting plate 130 and the valve plate 122 which is fixedly secured to the mounting plate 130 by solder, welds or by integral formation, to pivot bidiretionally. Additional mounting plates 131, as shown in FIG. 4, can be attached between the pivot pin 128 and the valve plate 122 for added stability of the valve plate 122.

The valve plate 122 is fixed to the mounting plate 130 and the pivot pin 128 in a laterally offset, off-center position. Due to this off-center pivot position, as shown in FIG. 3, one side portion 132 of the valve plate 122 to one side of a center of the pivot pin 128 is smaller in surface area than an opposite or larger surface area side portion 134 extending in an opposite direction from the center of the pivot pin 128.

A thermally responsive actuator 140 is mounted in the body 112. The thermally responsive actuator 140 can be any thermally responsive component, which is capable either of exhibiting movement, expansion, contraction, radial, axial or linear directions, in response to fluid temperature changes, such as the temperature of an engine coolant flowing through and around the thermally responsive actuator 140.

By example only, the thermally responsive actuator 140 is depicted as being the form of at least one or more bimetal material leaves 142, with two bimetal leaves 142 shown by example only. The bimetal material leaves 142 have a first end 144 affixed to the body 112 by a fastener, such as rivet 146. The bimetal material leaves 142 has an arcuate, or angular shape, between the first end 144 and an opposed, freely movable, second end 148. As shown in FIG. 4, the second end 148 is located intermediate along the length of the body 112 between the inlet 114 and the outlet 116. The fixed mounting of the first end 144 of the bimetal material leaves 142 to the body 112 allows the second end 148 of the bimetal material leaves 142 to exhibit movement in response to temperature changes of a fluid or coolant flowing through the body 112.

At a low engine coolant temperature, which is typical of the temperature of the engine coolant immediately after the engine started, the bimetal material leaves 142 are initially in a completely contracted or retracted position, as shown in FIG. 3. However, when the engine cooling temperature reaches a predetermined higher or hot temperature, the second end 148 of the bimetal material leaves 142 moves, as the bimetal material leaves 140 expand, away from the side of the body 112 toward the valve plate 122.

As shown in FIG. 4, an enlarged aperture 166 is formed in a spaced location adjacent the second end 148 of the bimetal material leaves 144.

A connecting member or link 160 is coupled between the mounting plate 130 and the second end 148 of the bimetal material leaves 142. By example only, the connecting member 160 is in the form of an L-shaped rod having an elongated linear first leg 159 and a bent, shorter second leg 161. One end of the elongated first leg 159 of the connecting member 160 extends through the enlarged aperture 166 in the second end 148 of the bimetal material leaves 142. The end of the first leg 159 is threaded and receives an adjustable nut 164. The nut 164 has a diameter larger than the diameter of the aperture 166 in the bimetal material leaves 142 so as to engage an outer surface of the bimetal material leaves 142 when the bimetal material leaves 142 are approaching contracted, cold fluid temperature position as shown by arrow 167 in FIG. 4. However, due to the enlarged diameter of the aperture 166, see arrow 169 in FIG. 5, when the second end 148 of the bimetal material leaves 142 expands and moves toward the valve plate 122 under increasing engine coolant fluid temperature, the second end 148 of the bimetal material leaves 142 is capable of movement along the first leg 159 of the connecting member 160 without contacting or moving the connecting member 160.

The shorter second leg 161 of the connecting member 160 is mounted in an aperture 163 in the mounting plate 130 to couple the connecting member 160 to the mounting plate 130.

An adjustment window 168 is formed in a wall portion of the body 112 allowing access to the nut 164 mounted on the connecting member 160. The adjustment window 168 allows the position of the nut 164 in the connecting member 160 to be adjusted to insure a fully closed position of the valve plate 122 with the valve seat surfaces 124 and 126 in the interior of the body 112 at engine fluid temperatures below a threshold temperature by adjusting the length of the first leg 159 between the mounting plate 130 and the second end 148 of the bimetal material leaves 142.

In operation, when the engine is off or just been started for the first time, the temperature of the engine coolant is normally at a low or "cold" temperature. This cold temperature causes the bimetal material leaves 142 to contract to the contracted position shown in FIG. 4. This contraction movement causes the second end 148 of the bimetal material leaves 142 to move outward toward the wall of the body 112 in the direction of arrow 167 until the portion of the bimetal material leaves surrounding the aperture 166 engages the nut 164. Continued contraction of the second end 148 of the bimetal material leaves 142 pushes the nut 164 outward toward the wall of the body 112. This pulls the connecting member 160 and the attached mounting plate 130 to a position in which the off center coupling of the valve plate 122 to the pivot pin 128 insures complete engagement of the outer periphery of the valve plate 122 with the valve seat surfaces 124 in the body 112 to block off fluid flow through the body 112.

When the engine coolant temperature rises above a predetermined or so called "hot threshold temperature", the bimetal material leaves 142 expand causing the freely movable second end 148 to move relative to the fixed first end 144 of the bimetal material leaves 142 in the direction of arrow 169 in FIG. 5. The second end 148 of the bimetal material leaves 142 moves freely along the first end portion 159 of the connecting member 160 due to the large diameter aperture 166 in the second end 148 of the bimetal material leaves 142. Since the nut 164 is now disengaged from the bimetal leaves 142, the connecting member 160 no longer constrains free pivotal movement of the valve plate 122. The pressure of the fluid flowing through the inlet 114 of the body 112 will act on the larger surface area portion 134 of the valve plate 122 with greater force than the opposite smaller surface area portion 132 of the valve plate 122. This causes the valve plate 122 to pivot in a counter clockwise direction, see arrow 171 in FIG. 5, in the orientation shown in FIG. 3 about the pivot pin 128 to a substantially vertical position within the body 112 allowing free fluid flow to the body 112 between the inlet 114 and the outlet 116.

When the engine is turned off, and the temperature of the engine fluid or coolant decreases back below the "hot threshold temperature" toward the "cold threshold temperature", the movable second end 148 of the bimetal material leaves 142 contract and move toward the outer wall of the body 112 until the second end 148 of the bimetal material leaves 142 engages the nut 164. Continued movement of the bimetal material leaves 142 forces the nut 164 and the attached connecting member 160, and the mounting plate 130 to pivot the valve plate 122 in a clockwise manner, arrow 167, FIG. 3, until the outer periphery of the valve plate 122 fully engages the valve seat surfaces 124 within the interior of the body 112 closing off further fluid flow through the body 112.

The typical failure mode for the thermostat 100 will be a mechanical failure or breakage of one or more of a mechanical connection of the connecting member ends 162 or a stripped threading of the nut 164. This failure mode results in a disconnection of the thermal actuator 140 to the valve plate 122. If the valve plate 122 remains in a closed position during engine operation, the engine coolant or fluid will continue to rise in temperature and could not escape the thermostat 100 thereby leading to catastrophic engine failure.

However, the disconnection of the bimetal material leaves 142 of the thermal actuator 140 and the valve plate 122 allows the valve plate 122 to freely pivot about the pivot pin 128 under the influence of the fluid pressure of the engine coolant. Due the unequal surface areas of the two sides of the valve plate with respect to the off center mounted pivot pin 128, the fluid pressure creates a larger force on the larger valve plate surface area 134 compared to the smaller surface area 132. This unequal force acting on the valve plate 122 causes the valve plate 122 to freely pivot about the pivot pin 128 to the substantially vertical position shown in FIG. 5 allowing coolant fluid through the thermostat body 112 to the engine radiator or heat exchanger.

What is claimed is:

1. An engine coolant thermostat comprising:
   a body adapted to be mounted in an engine coolant flow passageway;
   a valve plate mounted in the body movable between a coolant flow blocking and a coolant flow allowing position in the body, the valve plate coupled to the body in a position allowing the valve plate to normally pivot to the coolant flowing allowing position;
   a thermal responsive actuator mounted in the body having a first end fixed in the body and an opposed movable second end;
   an aperture formed in the second end of the thermal responsive actuator;
   one end of a connector non-contactingly extending through the aperture in the thermal responsive actuator;
   a threaded connection between the one end of the connector and a nut disposed on an exterior side of the thermal responsive actuator;
   an opposite end of the connector coupled to a mounting plate carried on the valve plate;
   the valve plate pivotally connected to the body diametrically off center to define a larger surface area on the valve plate to one side of a pivot connection and a smaller surface area of the valve plate to the opposed side of the pivot connection whereby the valve plate can freely pivot to the coolant flow allowing position under the influence of a force of the coolant flow differential on the larger and smaller surface area portions of the valve plate; and
   the second end of the thermal responsive actuator contracting to a first position in engaging the nut causing movement of the connector and pivoting of the valve plate to the first fluid blocking position.

2. The fail-safe engine coolant thermostat of claim 1 wherein:
   the thermal responsive actuator including at least one bimetal material leaf.

3. The fail-safe engine coolant thermostat of claim 1 further comprising:
   an aperture formed in a wall of the body allowing access to the nut to adjust a length of the connector relative to the thermal responsive actuator and the valve plate to dispose the valve plate in the fluid flow blocking position.

* * * * *